United States Patent [19]
Edmondson

[11] Patent Number: 5,278,783
[45] Date of Patent: Jan. 11, 1994

[54] FAST AREA-EFFICIENT MULTI-BIT BINARY ADDER WITH LOW FAN-OUT SIGNALS

[75] Inventor: John H. Edmondson, Cambridge, Mass.

[73] Assignee: Digital Equipment Corporation, Maynard, Mass.

[21] Appl. No.: 969,124

[22] Filed: Oct. 30, 1992

[51] Int. Cl.⁵ .................................... G06F 7/50
[52] U.S. Cl. ................................................ 364/787
[58] Field of Search ................................ 364/787

[56] References Cited

U.S. PATENT DOCUMENTS

| | | | |
|---|---|---|---|
| 3,805,045 | 4/1974 | Larsen | 364/787 |
| 3,814,925 | 6/1974 | Spannagel | 364/748 |
| 4,366,548 | 12/1982 | Kregness et al. | 364/748 |
| 4,764,886 | 8/1988 | Yano | 364/787 |
| 4,811,272 | 3/1989 | Wolrich et al. | 364/788 |
| 4,858,168 | 8/1989 | Hwang | 364/787 |
| 4,882,698 | 11/1989 | Young | 364/787 |
| 5,166,899 | 11/1992 | Lamb | 364/787 |

FOREIGN PATENT DOCUMENTS

| | | |
|---|---|---|
| 0075740 | 4/1983 | European Pat. Off. . |
| 0189912 | 8/1986 | European Pat. Off. . |
| 0295788 | 12/1988 | European Pat. Off. . |

OTHER PUBLICATIONS

Kai Huang, *Computer Arithmetic*, John Wiley & Sons, New York, N.Y. 1979, pp. 84–90.

Mead et al., *Introduction to VLSI Systems*, Chapter 5, Addison-Wesley Publishing Company (1980), pp. 145–180.

Ong et al., "A Comparison of ALU Structures for VLSI Technology," Proceedings of the 6th Symposium on Computer Arithmetic, IEEE, Piscataway, New Jersey (1983), pp. 10–16.

Oklobdzija et al., "Some Optimal Schemes for ALU Implementations in VLSI Technology," Proceedings of the 7th Symposium on Computer Arithmetic, IEEE, Piscataway, New Jersey (1985), pp. 2–8.

Han et al., "Fast Area-Efficient VLSI Adders," Proceedings of the 1987 Symposium on Computer Architecture, IEEE, Piscataway, New Jersey (1987), pp. 49–56.

*Primary Examiner*—Tan V. Mai
*Attorney, Agent, or Firm*—Albert P. Cefalo; Ronald C. Hudgens

[57] ABSTRACT

A carry look-ahead adder obtains high speed with minimum gate fan-in and a regular array of area-efficient logic cells in a datapath by including a first row of propagate-generate bit cells, a second row of block-propagate bit cells generating a hierarchy of block-propagate and block-generate bits, a third row of carry bit cells: and a bottom level of sum bit cells. The second row of block-propagate bit cells supply the block-propagate and block-generate bits to the first carry bit cells in chained segments of carry bit cells. In a preferred embodiment for a 32-bit complementary metal-oxide semiconductor (CMOS) adder, the logic gates are limited to a fan-in of three, and the block-propagate bit cells in the second row are interconnected to form two binary trees, each including fifteen cells, and the carry cells are chained in segments including up to four cells. In general, the interconnections between the block-propagate bit cells are derived from a graph which is optimized to meet the constraints of fast static complementary metal-oxide-semiconductor (CMOS) circuit design: low fan-out and small capacitance load on most signals. Sufficient gain stages are present in the binary trees to build-up to a large drive capability where the large drive capability is needed.

30 Claims, 9 Drawing Sheets

FAST AREA-EFFICIENT MULTI-BIT BINARY ADDER WITH LOW FAN-OUT SIGNALS

BACKGROUND OF THE INVENTION

1. Technical Field

The present invention relates generally to a and more particularly to a multi-level carry look-ahead adder. The invention specifically relates to a multi-level carry lookahead adder implemented as an array of regularly-spaced rows and columns of logic cells in a datapath.

2. Description of the Related Art

A digital computer typically includes a multiplicity of binary adders. At least one binary adder, for example, is used in an integer arithmetic logic unit (ALU) for performing addition, subtraction, multiplication, and division. A floating-point processor requires at least two adders, one for processing the mantissa, and another for processing the exponents. Additional adders are typically used for computing relative addresses for memory access or branch instructions.

In many digital computer designs, the speed of the computer is limited by the time required performing an addition or subtraction in the arithmetic logic unit. The time required for performing an addition or subtraction is typically limited by the time required for generating the "carry out" of the addition or subtraction, because the "carry out" of the addition or subtraction is a logical function of all of the input bits and the "carry in" to the adder or subtractor. Due to the large number of logical inputs defining the carry function, it is impractical to implement the carry function in just a few levels of gates, and instead the carry out is generated by intermediate carry signals that propagate through the adder.

Carry propagation is best understood with reference to a known adder design 20 shown in FIG. 1, which adds an augend A to an addend B and a carry in $C_{-1}$ to obtain a sum S and a carry-out $C_{n-1}$. It is assumed that A, B, and S are n-bit binary numbers. In other words, $A = A_{n-1} \ldots A_1 A_0$, $B = B_n B_{n-1} \ldots B_1 B_0$, and $S = S_{n-1} \ldots S_1 S_0$.

The adder 20 shown in FIG. 1 generates a number of intermediate functions. A "carry generate" function G is defined as:

$$G_i = A_i B_i$$

The carry generate function G indicates that a carry is originated at the ith stage of the adder. A "carry propagate" function P is defined as:

$$P_i = A_i \oplus B_i$$

The carry propagate function P is true when the ith stage of the adder will pass the incoming carry $C_{i-1}$ to the next higher stage. Moreover, when $P_i$ is generated by an exclusive-OR function between $A_i$ and $B_i$, then the carry propagate function P also indicates the "half sum" of $A_i$ and $B_i$. In this case, the carry $C_i$ and the full sum $S_i$ from the ith stage are related to the generate bit G and propagate bit $P_i$ by:

$$C_i = A_i \cdot B_i + (A_i \oplus B_i) \oplus C_{i-1}$$
$$= G_i + P_i \cdot C_{i-1}$$

$$S_i = (A_i \oplus B_i) \oplus C_{i-1}$$
$$= P_i \oplus C_{i-1}$$

As illustrated in FIG. 1, the digital logic for the adder 20 can use gates having a low fanin and a low fan-out, and the gates can be arranged as an array of regularly-spaced rows and columns of logic cells in a datapath. The datapath in the adder 20 extends from the top (the A and B inputs) to the bottom (the S outputs). The cells include a first row 21 of propagate-generate bit cells 22, 23; a second row 24 of carry bit cells 25, 26; and a third row 27 of sum bit cells 28, 29. Each propagate-generate bit cell 22, 23 in the ith column or bit position of the adder 20 includes a respective AND gate 31, 32 providing the generate bit $G_1$, and a respective exclusive-OR gate 33, 34 providing the propagate bit $P_i$. Each carry bit cell 25, 26 includes a respective AND gate 35, 36 and a respective OR gate 37, 38 which together provide the carry bit $C_i$. Each sum bit cell 28, 29 includes a respective exclusive-OR gate 40, 41 providing the sum bit $S_i$.

One disadvantage of the adder circuit 20 is that the speed of the adder is limited by the time for a carry signal to propagate left-to-right through the chain of carry bit cells 25, 26 from the carry input $C_{-1}$ to the carry output $C_{n-1}$. In particular, the carry propagation time is a linear function of the number of columns n in the adder, and therefore the adder 20 is very slow when it has a large number n of columns or bits. A known solution to this problem is to use carry look-ahead logic to reduce the time for generating the more significant carry bits. The carry look-ahead logic has logic gates for more directly solving the carry function:

$$C_{n-1} = G_{n-1} + G_{n-2} P_{n-1} + \ldots + C_{-1} P_0 P_1 \ldots P_{n-1}$$

In general, the equation $C_i = G_i + P_i \cdot C_{i-1}$ is known as a "recurrence relation," and repeated application of the "recurrence relation" computes the carry function. Cells of logic gates which together compute the carry function are known as "recurrence solvers."

As disclosed in Kai Huang, *Computer Arithmetic*, John Wiley & Sons, New York, N.Y., 1979, pp. 84–90, the carry function can be computed by "block carry generate" G* and "block carry propagate" P* functions in multi-level circuits. Shown in FIG. 3.13 on page 90 of Huang, for example, is a two-level carry look-ahead adder with a 32-bit word length arranged in an 8-by-4 configuration. The carry generation logic includes an upper level of eight four-bit block-carry look-ahead units and a lower level having an 8-bit carry look-ahead unit. Each four-bit block-carry look-ahead unit generates block carry generate and block carry propagate functions, for i=3, 7, 11, 15, 19, 23, 27, and 31:

$$G_1^* = G_i + G_{i-1} P_i + G_{i-2} P_i P_{i-1} + G_{i-3} P_i P_{i-1} P_{i-2}$$

$$P_i^* = P_{i-1} P_{i-2} P_{i-3}$$

The lower-level unit generates the carry functions $C_i$ for i=3, 7, 11, 15, 19, 23, 27, and 31 according to:

$$C_i = G_i^* + G_{i-4}^* P_1^* + \ldots + C_{-1} P_i^* P_{1-4}^* \ldots P_3^*$$

Disadvantages of the circuit in FIG. 3.13 of Huang are the need for multi-input logic gates, and the absence of regular gate cells for the carry logic at the columns or bit positions in the data path of the adder.

General design techniques for high-speed and area-efficient very-large-scale integrated circuit (VLSI) technology has been the subject of continuing research. As observed by Ong et al., "A comparison of ALU structures for VLSI technology," Proceedings of the 6th Symposium on Computer Arithmetic, IEEE, Piscataway, N.J. (1983), pp. 10–16, there is a continuing need to reevaluate the design techniques in the context of developments in VLSI circuit technology. Furthermore, recent work in complexity of algorithms, particularly the solution of recurrence relations, suggests new candidate structures for generating the carry vector and raises questions as to their practicality in modern logic design practice. Floor plans for two-bit and four-bit look-ahead carry assimilations for 16-bit adders are shown in FIGS. 5 and 6 of Ong et al. A floor plan of a 16-bit adder suggested by recurrence solvers is shown in FIG. 9 of Ong et al., and this floor plan includes four rows of carry-logic cells.

A carry-skip scheme is disclosed in Oklobdzija et al., "Some optimal schemes for ALU implementation in VLSI technology," Proceedings of the 7th Symposium on Computer Arithmetic, IEEE, Piscataway, N.J. (1985), pp. 2–8. The carry-generate portion, which consumes a large amount of logic, is eliminated. As in a carry look-ahead adder, the bits to be added are divided into groups. A circuit is provided for detecting when a carry signal entering a group will ripple through the group. When this condition is detected, the carry is allowed to skip over the group.

Graph representations for designing area-time efficient VLSI adders are disclosed in Han et al., "Fast area-efficient VLSI adders," Proceedings of the 1987 Symposium on Computer Architecture, IEEE, Piscataway, N.J. (1987), pp. 49–56. When a prefix graph is used as a basis for designing binary addition circuitry in VLSI, each node of the graph represents a set of logic equations. Thus, each node can be thought of as a processing element that will be expanded from being a point in the graph to occupy a fixed amount of area in the layout. For binary addition, four types of processing elements can be used: pggen, black, white, and sum. The pggen cell produces initial p and g signals (carry propagation and generation signals). The black cell comprises a pair of p signals and a pair of g signals to generate a p and g signal at a lower level. Two different types of black cells are used: a positive input, negative output cell; and a negative input, positive output cell. The white cell is a simple inverter that inverts a p signal and a g signal. The sum cell generates the sum bit from a propagate bit, a generate bit, and two carry bits. Because the carries produced by the carry generation circuitry alternate between being positive and negative, there are two types of sum cells: one type takes two carries without inversion, and the other takes two carries with inversion. The carry look-ahead adder based on the hybrid prefix algorithm is densely packed by using a folding method. The folding method places two levels of the prefix graph into one level of the layout, since space is available to embed cells.

As is evident from the above references, recurrence solvers have the advantage that the gate levels required to calculate the carry for large groups of bits grows slowly as a function of the number of bits. But the previously implemented or proposed recurrence solvers have had high fan-out, many long interconnections, or excessive levels of gates, which have resulted in a relatively slow complementary metal-oxide-semiconductor (CMOS) implementation.

SUMMARY OF THE INVENTION

The present invention involves a particular method of adding an n-bit binary augend $A = A_{n-1}, A_{n-2}, \ldots, A_i, \ldots, A_0$ to an n-bit binary addend $B = B_{n-1}, B_{n-2}, \ldots, B_i, \ldots, B_0$ and a carry-in $C_{-1}$ to compute an n-bit sum $S = S_{n-1}, S_{n-2}, \ldots, S_i, \ldots, S_0$ and a carry-out $C_{n-1}$. The method includes steps of computing, from each augend bit $A_i$ and a corresponding addend bit $B_i$, a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$; using the propagate bits and generate bits to solve the recurrence relation for $i = 0$ to $n-1$ to generate the carry bits $C_{n-1}, C_{n-2}, \ldots, C_i, \ldots, C_0$; and computing each of the sum bits $S_i$ from a corresponding one of the propagate bits $P_i$ and a corresponding one of the carry bits $C_{i-1}$. Some of the carry bits $C_i$ are computed directly from a corresponding generate bit $G_i$ and a corresponding propagate bit $P_i$ and a corresponding carry-in bit $C_{i-1}$. The carry bits which are generated but not computed directly from a corresponding generate bit $G_i$ and a corresponding propagate bit $P_i$ and a corresponding carry-in bit $C_{i-1}$ are computed by generating a hierarchy of block-propagate and block-generate bits, including block-propagate bits and block-generate bits computed at a base level of the hierarchy by combining pairs of adjacent propagate bits $P_{i+1}, P_i$ and pairs of adjacent generate bits $G_{i+1}, G_i$. Moreover, a multiplicity of the carry bits which are generated and computed directly from a corresponding generate bit $G_i$ and a corresponding propagate bit $P_i$ and a corresponding carry-in bit $C_{i-1}$ are included in a multiplicity of strings each including three adjacent carry bits $C_i, C_{i+1}, C_{i+2}$ which are each computed directly from a corresponding generate bit and a corresponding propagate bit and a corresponding carry-in bit.

An adder in accordance with the invention includes a multiplicity of n propagate-generate bit cells of logic gates. Each of the propagate-generate bit cells receives a corresponding augend bit $A_i$ and a corresponding addend bit $B_i$ to compute a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$. The adder also includes a multiplicity of recurrence solver cells of logic gates, the recurrence solver cells being responsive to the propagate bits and generate bits for solving the recurrence relation for $i = 0$ to $n - 1$ to generate the carry bits $C_{n-1}, C_{n-2}, \ldots, C_i, \ldots, C_0$. The recurrence solver cells include a multiplicity of carry bit cells, each of the carry-bit cells solving the recurrence equation to compute a corresponding carry-out bit $C_i$ from a corresponding generate bit $G_i$ and a corresponding propagate bit $P_i$ and a corresponding carry-in bit $C_{i-1}$. The adder further includes a multiplicity of n sum bit cells of logic gates, each of the sum bit cells being connected to a respective one of the propagate-generate cells and each receiving a corresponding one of the carry bits $C_{i-1}$ to generate a corresponding one of the sum bits $S_i$, and wherein the recurrence solver cells further include a hierarchy of block-propagate bit cells for generating a hierarchy of block-propagate and block-generate bits, some of the block-propagate bit cells being at a base level of the hierarchy of block-propagate cells and combining propagate bits $P_{i+1}$, $P_i$ and generate bits $G_{i+1}$, $G_i$ of adjacent ones of the propagate-generate bit cells to generate block-propagate bits and block-generate bits responsive to the combined propagate bits $P_{i+1}$, $P_i$ and generate bits $G_{i+1}$, $G_i$ of adjacent ones of the propagate-generate bit cells.

In accordance with one aspect of the invention, a multiplicity of the carry bit cells are chained in a plurality of segments such that each of the segments includes: a first carry bit cell responsive to one of the block-generate bits; a second carry bit cell receiving a carry $C_{i-1}$ generated by the first carry bit cell, and a propagate bit $P_i$ and generate bit $G_i$ from a corresponding one of the propagate-generate bit cells; and a third carry bit cell receiving a carry $C_i$ generated by the second carry bit cell, and a propagate bit $P_{i+1}$ and generate bit $G_{i+1}$ from a corresponding one of the propagate-generate bit cells.

In accordance with another aspect of the invention, the cells in the adder are physically arranged in an array of four rows and n columns on a planar semiconductor substrate. The rows include a first row of the propagate-generate bit cells, a second row of the block-propagate bit cells, a third row of the carry bit cells, and a fourth row of the sum bit cells, wherein the second row is disposed between the first row and the third row, and the third row is disposed between the second row and the fourth row. Therefore the adder is very compact and area efficient as well as very fast.

In a preferred embodiment, the logic gates are complementary metal-oxide-semiconductor (CMOS) logic gates having a fan-in of two and a fan-in of three. The block-propagate bit cells are interconnected to form two binary trees each including a similar number of the block-propagate bit cells. The first one of the binary trees combines lower-order propagate-bits and generate bits with the carry-in bit $C_{-1}$, and a second one of the binary trees combines higher-order propagate bits and generate bits. The first one of the binary trees has a root consisting of one of the block-propagate bit cells that generates a carry bit $C_x$ of order x of about one-half of n. The carry bit $C_x$ is received by a plurality of the carry bit cells which each receive a corresponding block-generate bit and block-propagate bit from the second one of the binary trees.

In a 32-bit adder (n=32) constructed in accordance with the preferred embodiment of the invention, the number x is 14, and the segments include three segments of three chained carry bit cells, and four segments of four chained carry bit cells. The first carry bit cells in the segments generate carries $C_i$ for bit positions i=3, 7, 10, 15, 18, 22, and 26. The number of gate levels needed to calculate the carries for the large groups of low-order bits is less than the number of gate levels required in a conventional look-ahead adder. The carry-chain cells present a relatively light load on most carry outputs of the block-propagate bit cells, except for the carry output from the bit position 14, which is easily driven because sufficient gate levels exist to allow the build-up of drive strength. The logic gate cells are physically arranged in four rows with each element in a particular row and bit position. The arrangement results in efficient allocation of the load (made up of wire capacitance and gate input capacitance) so that high speed is realized on all signals.

In general, the interconnections between the block-propagate bit cells are derived from a graph which is optimized to meet the constraints of fast static complementary metal-oxide-semiconductor (CMOS) circuit design: low fan-out and small capacitance load on most signals. Sufficient gain stages are present in the recurrence solver to build up to a large drive capability where the large drive capability is needed.

BRIEF DESCRIPTION OF THE DRAWINGS

Other objects and advantages of the present invention will become apparent upon reading the following detailed description and upon reference to the drawings, in which.

While the present invention will be described in connection with certain preferred embodiments, it will be understood that it is not intended to limit the invention to these particular embodiments. On the contrary, it is intended to cover all modifications, alternatives, and equivalent arrangements as fall within the scope of the invention as defined by the appended claims.

DETAILED DESCRIPTION OF THE PREFERRED EMBODIMENT

The present invention concerns a high-speed multilevel carry look-ahead adder implemented as an array of regularly-spaced rows and columns of logic cells in a datapath. In particular, the present invention incorporates carry look-ahead logic into the basic adder configuration of FIG. 1 in such a way as to obtain the advantages of the basic configuration of FIG. 1 without the disadvantage of low speed. Although a specific embodiment of a 32-bit adder incorporating the present invention will be described below with reference to FIGS. 12A, 12B, 12C, and 12D, it should be understood that the present invention is generally applicable to binary adders for adding numbers having a large number of bits. In any case, a binary adder, in accordance with the present invention, can be constructed from a number of primitive cells of logic gates. Some of these primitive cells correspond to the logic functions used in the conventional adder of FIG. 1, and other of the cells are used for the look-ahead carry logic which is not found in the conventional adder of FIG. 1.

Figure 1:
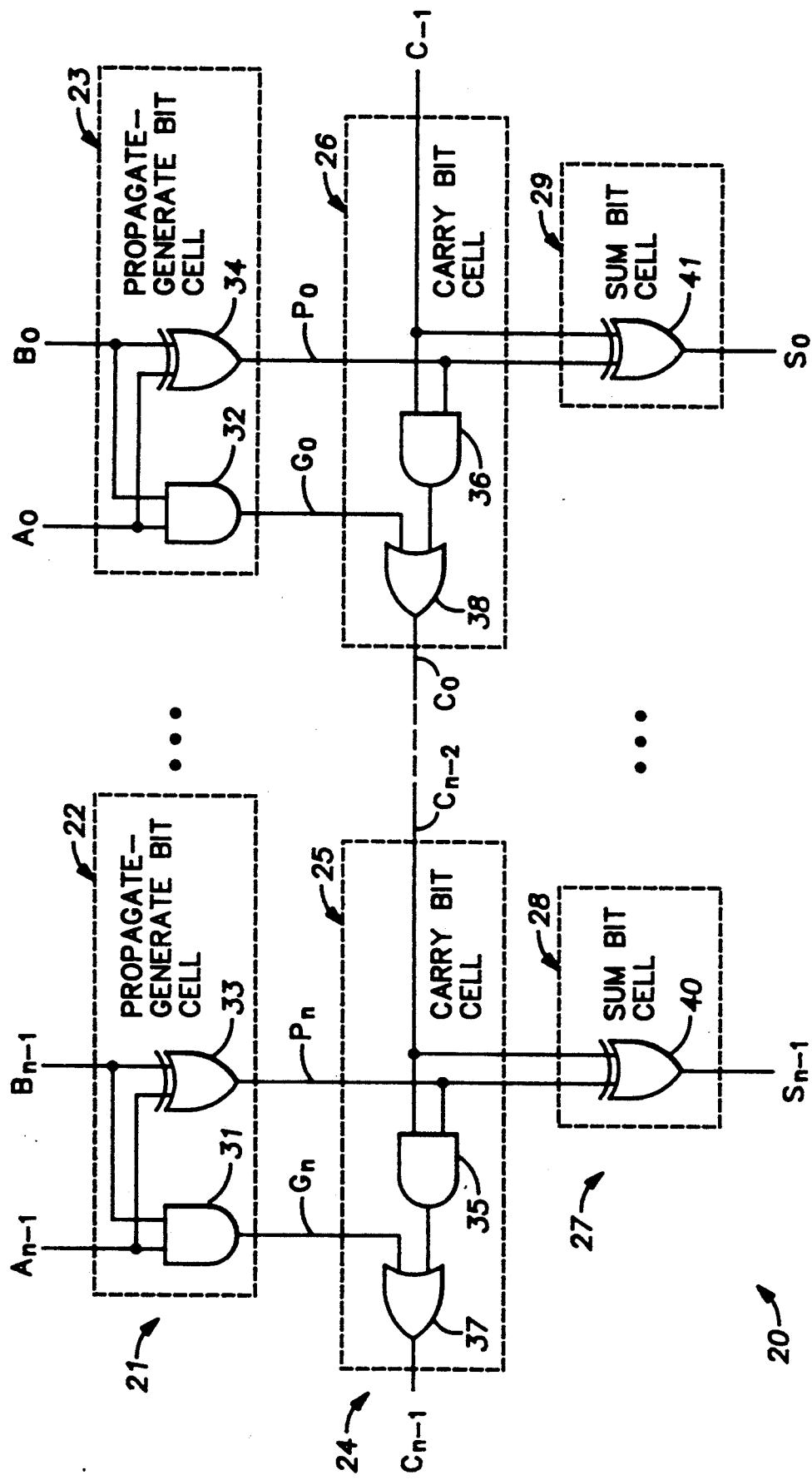
FIG. 1 labeled PRIOR ART, is a schematic diagram of a conventional binary adder made of propagate-generate bit cells, carry bit cells, and sum bit cells.
Figure 2B:
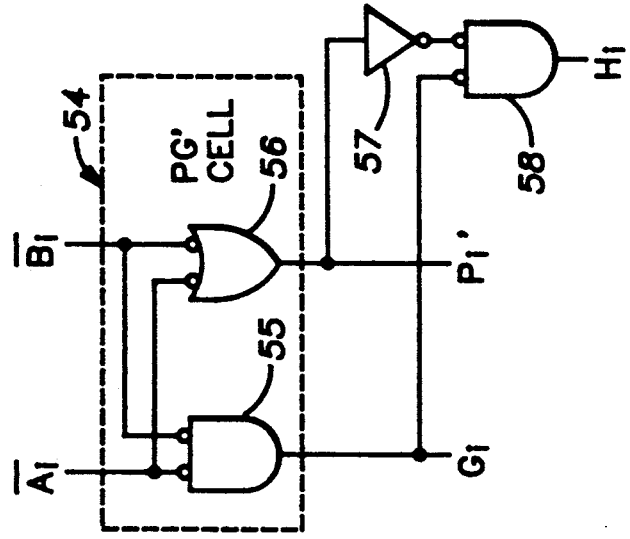
FIG. 2B is a schematic diagram of an alternative circuit for a propagate-generate bit cell (PG') that could be used in the adder of the present invention.
Figure 2A:
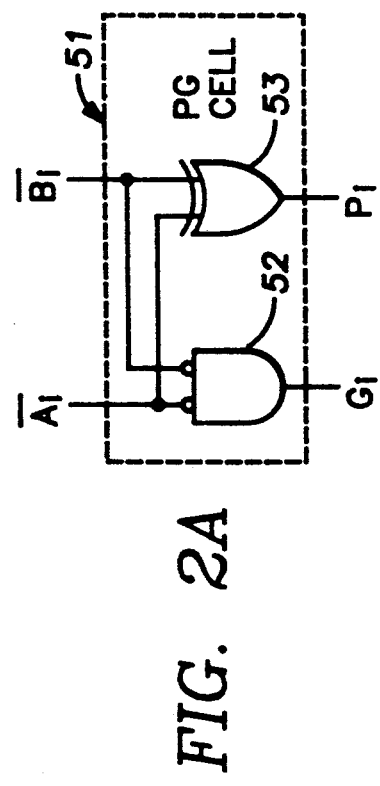
FIG. 2A is a schematic diagram of a propagate-generate bit (PG) cell used in the adder of the present invention.

Turning now to FIG. 2A, there is shown a schematic diagram of a "PG" cell 51 corresponding to the propagate bit and generate bit cell 22 in FIG. 1. The PG cell 51 in FIG. 2A receives an augend bit $A_i$ asserted low and an addend bit $B_i$ asserted low. A NOR gate 52 combines the augend bit $A_i$ and the addend bit $B_i$ to produce a corresponding generate bit $G_i$, and an exclusive OR gate 53 combines the augend bit $A_i$ and the addend bit $B_i$ to produce a corresponding propagate bit $P_i$.

Turning now to FIG. 2B, there is shown an alternative PG' cell which could be used to slightly increase the speed of the adder. Although the propagate function is usually considered as an exclusive-OR of the addend $A_i$ and the augend $B_i$, it should be apparent that the carry generation equations are not affected when a regular OR function is used to produce the propagate bits $P_i$. The exclusive-OR function requires more than one level of gates, and therefore more propagation delay, than the regular OR function, so that the carries can be generated more quickly when a regular OR function is used. When a regular OR function is used, however, then it is still necessary to include logic that generates the exclusive-OR of the augend $A_i$ and the addend $B_i$, because the exclusive-OR function is needed to provide a half sum $H_i$ that is applied to the sum bit cells. In other words, when the PG' cell 54 of FIG. 2B is used in place of the PG cell 51 of FIG. 2A, then the half sum signal $H_i$ is fed to the sum bit cells (such as cells 28 and 29 in FIG. 1) instead of the propagate bit $P_i'$. As shown in FIG. 2B, the PG' cell 54 includes a NOR gate 55 to produce the generate bit $G_i$, and a NAND gate 56 to produce the propagate bit $P_i'$. Moreover, when the alternative PG' cell 54 is used, additional logic, such as an inverter 57 and a NOR gate 58, is needed for producing the half sum bit $H_i$, which is fed to the sum bit cells (28 and 29 of FIG. 1) in lieu of the $P_i$ signal.

Persons of ordinary skill in the computer art recognize that other kinds of propagate bit and generate bit cells could be used in practicing the present invention. For constructing multifunction adder/subtractor units in an arithmetic logic unit of a digital computer, the propagate bit and generate bit cells may include additional mode selecting logic to select either the sum, difference, or complements of the augend $A_i$ or addend $B_i$. In particular, the mode selection logic for such a multi-function GP cell is:

$$G_i'' = (A_i M_0 + A_i M_1) \cdot (B_i M_2 B_i M_3)$$

$$P_i'' = (A_i M_0 + A_i M_1) \oplus (B_i M_2 + B_i M_3)$$

where $M_0$, $M_1$, $M_2$, and $M_3$ are mode select signals provided by instruction microcode.

Figure 3:
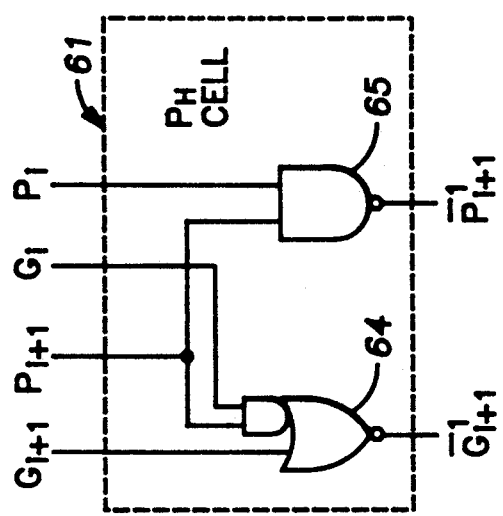
FIG. 3 is a schematic diagram of a "$P_H$" cell used in the adder of the present invention for combining adjacent pairs of propagate bits and generate bits.

Turning now to FIG. 3, there is shown a schematic diagram of a $P_H$ cell 61. The $P_H$ cell 61 is used for combining a pair of generate bits and propagate bits, asserted high, to produce a corresponding block-generate bit and bit-propagate bit, asserted low. In the specific 32-bit adder of FIGS. 12A-12D, a number of $P_H$ cells 61 are used to combine adjacent generate bits and propagate bits from pairs of adjacent PG cells 51 of FIG. 2A. As shown in FIG. 3 and in the following schematics of the cells, the block-generate and block-propagate bits are denoted by $G^L$ and $P^L$, respectively, with a superscript $L$ indicating the number of the level in the hierarchy of block-propagate bit cells, as further described below with reference to FIG. 13. In addition, the block-propagate and block-generate bits have subscripts indicating the bit position of any carry signal that would be generated from the block-propagate and block-generate bits by a carry bit cell, such as the carry bit cells 25, 26 in FIG. 1.

As shown in FIG. 3, the $P_H$ cell 61 includes an AND-OR-INVERT gate 64 combining the propagate bit $P_{i+1}$ and the generate bit $G_i$ and the generate bit $G_{i+1}$ to produce the block-generate bit $G^1_{i+1}$, and a NAND gate 65 combining the propagate bits $P_{i+1}$ and $P_i$ to produce the block-propagate bit $P^1_{i+1}$.

Figure 4:
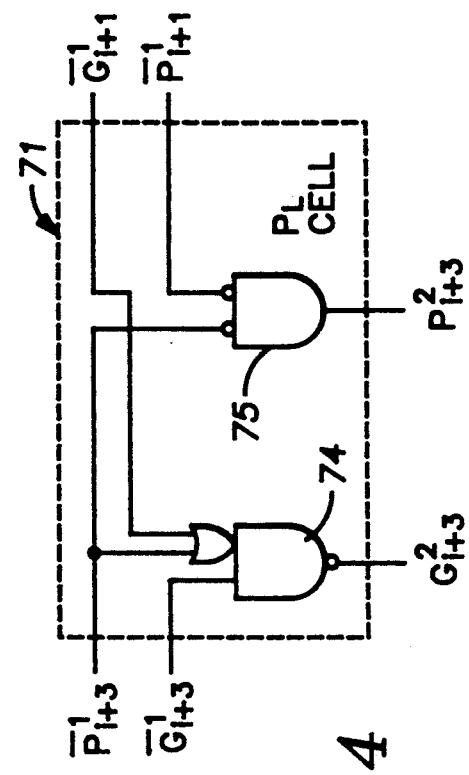
FIG. 4 is a schematic diagram of a "$P_L$" cell used in the adder of the present invention for combining adjacent block-propagate and block-generate bits from a pair of $P_H$ cells of FIG. 3.

Turning now to FIG. 4, there is shown a schematic diagram of a $P_L$ cell 71 which is used for combining pairs of block-propagate bits and block-generate bits asserted low to produce a block-generate bit and a block-propagate bit asserted high. In the 32-bit adder of FIGS. 12A-12D, the $P_L$ cell 71 is used to combine the block-propagate and block-generate bits from a pair of adjacent $P_H$ cells 61 of FIG. 3.

The $P_L$ cell 71 of FIG. 4 includes an OR-AND-INVERT gate 74 combining the higher order propagate bit $P^1_{i+3}$ asserted low with the lower order generate bit $G^1_{i+1}$ asserted low and the higher order block-generate bit $G^1_{i+3}$ asserted low to produce the block-generate bit $G^2_{i+3}$ asserted high, and a NOR gate 75 combining the block-propagate bits $P^1_{i+3}$ and $P^1_{i+1}$ asserted low to produce the block-propagate bit asserted high.

Figure 5:
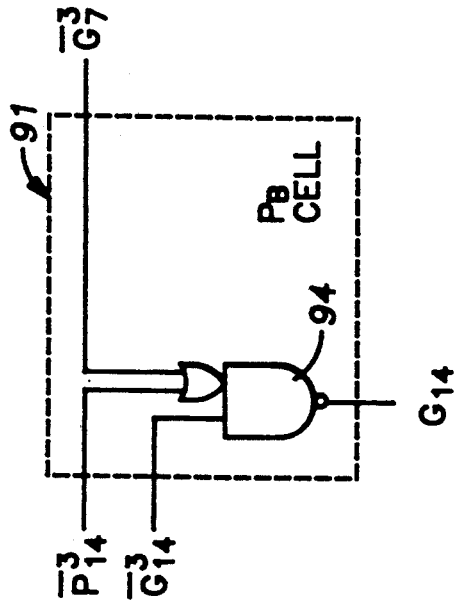
FIG. 5 is a schematic diagram of a "$P_{MH}$" cell used in the adder of the present invention for combining adjacent block-propagate and block-generate bits from a pair of $P_L$ cells of FIG. 4.

Turning now to FIG. 5, there is shown a schematic diagram of a $P_{MH}$ cell 81 that is used to combine a pair of block-propagate bits asserted high and a pair of block-generate bits asserted high to produce a block-generate bit and a block-propagate bit asserted low. The $P_{MH}$ cell 81 has an AND-OR-INVERT gate 84 and a NAND gate 85 connected together in a fashion similar to the components 64 and 65 in the $P_H$ cell 61 of FIG. 3. For the 32-bit adder of FIGS. 12A-12D, the $P_{MH}$ cell 81 differs from the $P_H$ cell 61 by having its inputs connected from its sides instead of the top of the cell.

Figure 6:
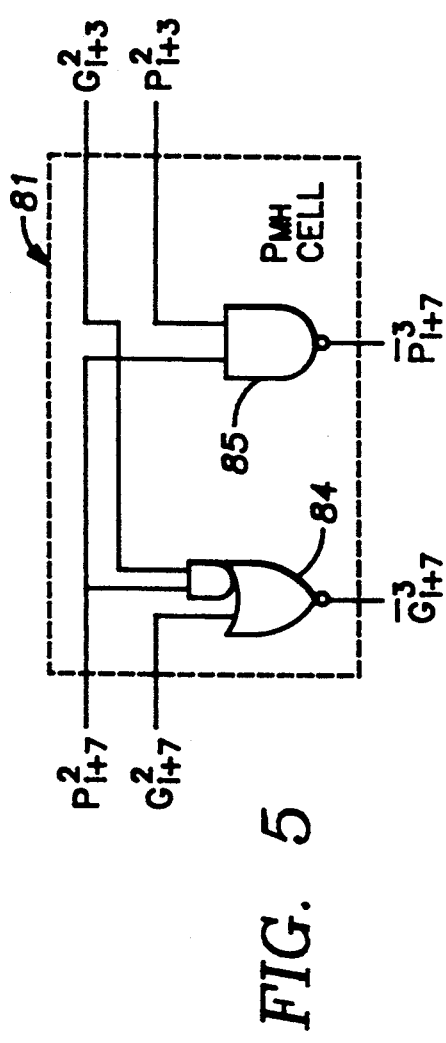
FIG. 6 is a schematic diagram of a "$P_S$" cell used in the adder of the present invention for combining outputs of a pair of $P_{MH}$ cells of FIG. 5 to generate a carry signal.

Turning now to FIG. 6, there is shown a schematic diagram of a $P_B$ cell 91 used in the 32-bit adder of FIGS. 12A-12D (see FIG. 12A) for generating a carry signal $C_{14}$ for the bit position 14 from a block-generate bit $G^3{}_{14}$ asserted low, a block-propagate bit $P^3{}_{14}$ asserted low, and a block-generate bit $G^3{}_7$ asserted low. The $P_B$ cell 91 includes an OR-AND-INVERT gate 94, which is similar to the gate 84 of the $P_{MH}$ cell 81 in FIG. 5, but the $P_B$ cell does not have a gate corresponding to the gate 85 in FIG. 5, the gate 65 in FIG. 3, nor 75 in FIG. 4. The $P_B$ cell 91 differs from the $P_H$, $P_{MH}$, and $P_L$ cells by having a current drive capability that is twice the current drive capability of the $P_H$, $P_{MH}$, amd $P_L$ cells because the $P_B$ cell must drive rather lengthy wiring extending from the low order part of the adder to the high order part of the adder. Because the $P_B$ cell 91 has one fewer gate than the $P_H$, $P_{MH}$, and $P_L$ cells, the $P_B$ cell can fit into the same amount of chip area as the $P_H$, $P_{MH}$, and $P_L$ cells and also have sufficient area for larger transistors for providing the doubled current drive capability. Only the $P_B$ cell has an increased current drive capability; the other cells have the same standard current drive capability.

Figure 7:
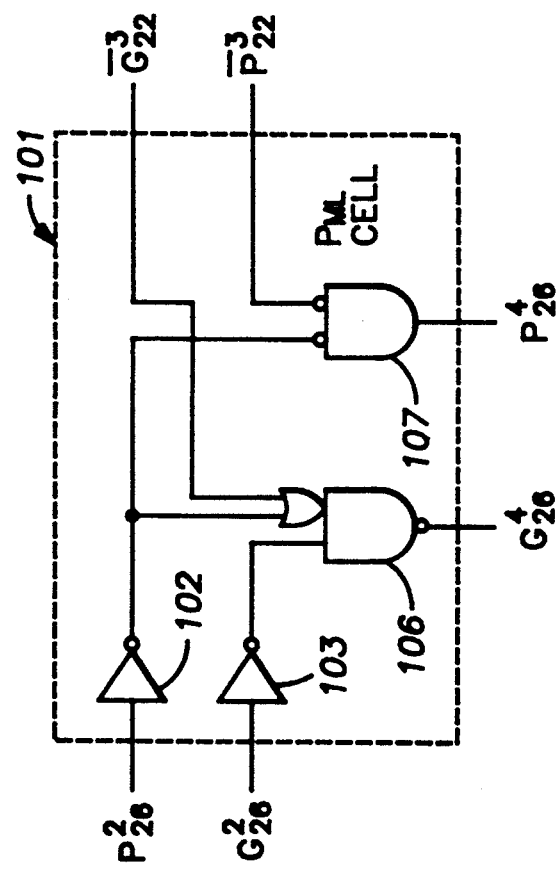
FIG. 7 is a schematic diagram of a "$P_{ML}$" cell used in the adder of the present invention for combining the propagate and generate bits of a $P_L$ cell of FIG. 4 and a $P_{MH}$ cell of FIG. 5.

Turning now to FIG. 7, there is shown a schematic diagram of a $P_{ML}$ cell 101 which is used in the 32-bit adder of FIGS. 12A-12D (see FIG. 12C) for generating a block-generate bit $G^4{}_{26}$ asserted high and a block-propagate bit $P^4{}_{26}$ asserted high from a block-generate bit $G^2{}_{26}$ asserted high and block-propagate bit $P^2{}_{26}$ asserted high, and a block-generate bit $G^3{}_{22}$ asserted low and a block-propagate bit $P^3{}_{22}$ asserted low. The block-propagate bit $P^2{}_{26}$ is inverted by an inverter 102, and the block-generate bit $G^2{}_{26}$ is inverted by an inverter 103. To generate the block-generate bit $G^4{}_{26}$, an OR-AND-INVERT gate 106 combines the output of the inverter 102 with the block-generate bit $G^3{}_{22}$ asserted low and the output of the inverter 103. To produce the block-propagate bit $P^4{}_{26}$, a NOR gate 107 combines the output of the inverter 102 with the block-propagate bit $P^3{}_{22}$ asserted low. The gates 106, 107 are similar to the gates 84, 85 in the $P_{MH}$ cell 81 of FIG. 5.

Figure 8:
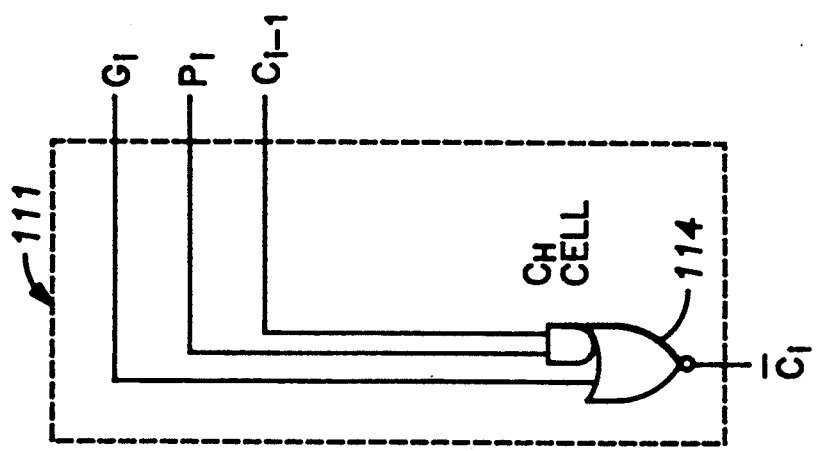
FIG. 8, is a schematic diagram of a carry bit cell ($C_L$) used in the adder of the present invention for receiving a carry-in bit asserted high and generating a carry-out bit asserted low.

Turning now to FIG. 8, there is shown a schematic diagram of a $C_H$ cell 111 used for combining a generate bit $G_i$ and a propagate bit $P_i$ with a carry bit $C_{i-1}$ asserted high to generate a carry bit $C_i$ asserted low. The $C_H$ cell includes an AND-OR-INVERT gate 114 combining the propagate bit $P_i$ and the carry bit $C_{i-1}$ asserted high, and the generate bit $G_i$ to produce the carry bit $C_i$ asserted low.

Figure 9:
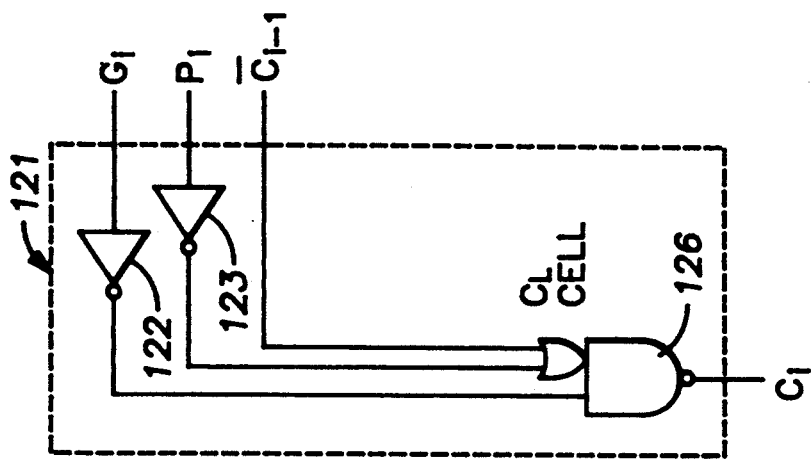
FIG. 9 is a schematic diagram of a carry bit cell ($C_H$) used in the adder of the present invention for receiving a carry-in bit asserted low and generating a carry-out bit asserted high.

Turning now to FIG. 9, there is shown a schematic diagram of a $C_L$ cell 121 for generating a carry bit $C_i$ from a generate bit $G_i$, a propagate bit $P_i$, and a carry bit $C_{i-1}$ asserted low. An inverter 122 inverts the generate bit $G_i$, and an inverter 123 inverts the propagate bit $P_i$. An OR-AND-INVERT gate 126 combines the output of the inverter 123 with the carry bit $C_{i-1}$ asserted low and the output of the inverter 122 to produce the carry bit $C_i$ asserted high.

Figure 10:
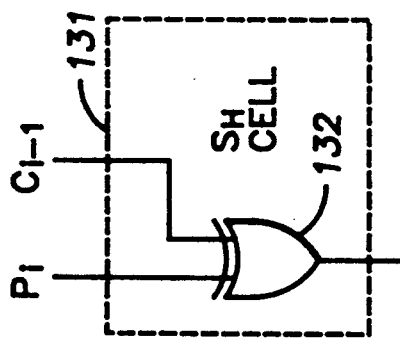
FIG. 10 is a schematic diagram of a sum bit cell ($S_H$) used in the present invention for combining a propagate bit with a carry bit asserted high.

Turning now to FIG. 10, there is shown a schematic diagram of a $S_H$ cell 131 which has an exclusive-OR gate 132 combining the propagate bit $P_i$ and the carry bit $C_{i-1}$ to produce the sum bit $S_i$.

Figure 11:
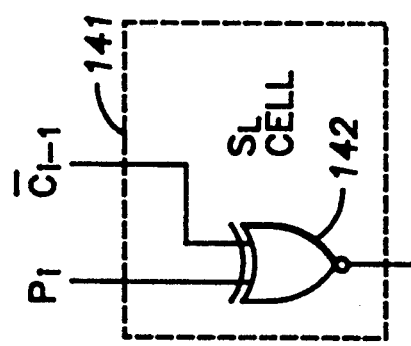
FIG. 11 is a schematic diagram of a sum bit cell ($S_L$) used in the present invention for combining a propagate bit with a carry bit asserted low.

Turning now to FIG. 11, there is shown a schematic diagram of a $S_L$ cell 141 which produces the sum bit $S_i$ from the propagate bit $P_i$ and the carry bit $C_{i-1}$ asserted low. The $S_L$ cell has an exclusive-NOR gate 142 for combining the propagate bit $P_i$ with the carry bit $C_{i-1}$ asserted low to produce the sum bit $S_i$.

Figure 12A:
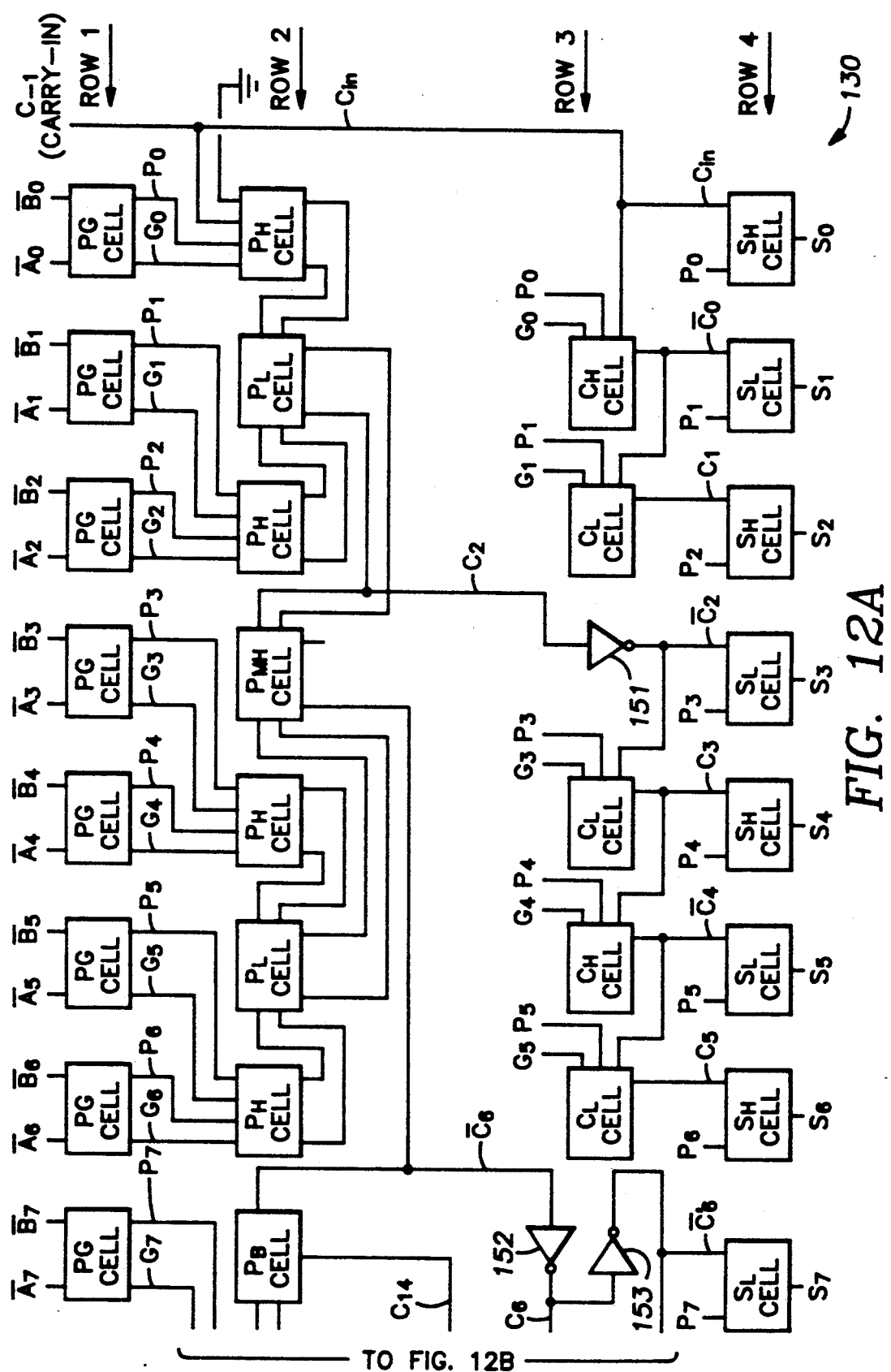
FIGS. 12A, 12B, 12C, and 12D, in combination, show a 32-bit adder in accordance with the present invention.

Turning now to FIGS. 12A-12D, there is shown a layout diagram of a 32-bit adder generally designated 130 that incorporates the present invention. The adder 130 includes a multiplicity of cells as previously shown and described with respect to FIG. 2A and FIGS. 3-11. Each cell can be identified by its physical coordinates specified by a bit position or column and a row number in the array of cells. The bit position or column of each cell in the array is evident from the subscripts on the corresponding augend $A_i$ and addend $B_i$ bit, input from the top of each column of cells, and the sum bit $S_i$ output from the bottom of each column of cells. The top row (ROW 1) of the array of cells in the adder 130 consists of PG cells, as shown in FIG. 12A.

A second row (ROW 2) of the array of cells in the adder 130 consists of block-propagate bit cells. The block-propagate bit cells are $P_H$ cells, $P_L$ cells, $P_{MH}$ cells, $P_{ML}$ cells, or $P_B$ cells, as more particularly shown in FIGS. 3 to 7. The type of block-propagate bit cell depends on the row and column coordinates of the cell, as shown in FIGS. 12A to 12D, and as summarized in the table below:

| Column or Bit Position | Recurrence Cell Type |
|---|---|
| 0 | $P_H$ |
| 1 | $P_L$ |
| 2 | $P_H$ |
| 3 | $P_{MH}$ |
| 4 | $P_H$ |
| 5 | $P_L$ |
| 6 | $P_H$ |
| 7 | $P_B$ |
| 8 | $P_H$ |
| 9 | $P_L$ |
| 10 | $P_H$ |
| 11 | $P_{MH}$ |
| 12 | $P_H$ |
| 13 | $P_L$ |
| 14 | $P_H$ |
| 15 | — |
| 16 | $P_H$ |
| 17 | $P_L$ |
| 18 | $P_H$ |
| 19 | $P_{MH}$ |
| 20 | $P_H$ |
| 21 | $P_L$ |
| 22 | $P_H$ |
| 23 | $P_{ML}$ |
| 24 | $P_H$ |
| 25 | $P_L$ |
| 26 | $P_H$ |
| 27 | $P_{MH}$ |
| 28 | $P_H$ |
| 29 | $P_L$ |
| 30 | $P_H$ |
| 31 | — |

Block-propagate bit cells are absent from column or bit positions 15 and 31 in row 1.

In particular, a $P_H$ recurrence cell in row 1 and bit position 0 (FIG. 12A) combines the carry-in bit ($C_i$) with the $G_0$ and $P_0$ bits to generate $G_0^1$ and $P_0^1$ bits. $P_H$ recurrence cells at row 1 and bit positions 2, 4, 6, . . . , i, . . . , 30 combine the $G_i$ and $P_i$ bits with the $G_{i-1}$ and $P_{i-1}$ bits to generate $G_i^1$ and $P_i^1$ bits. Each $P_L$ recurrence cell in row 1 and bit positions i=1, 5, 9, 13, 17, 21, 25, 29 combine the $G^1{}_{i+1}$ and $P^1{}_{i+1}$ bits from the $P_H$ recurrence cell in row 1 and bit position i+1 with the $G^1{}_{i-1}$ and $P^1{}_{i-1}$ bits from the $P_H$ recurrence cell in row 2 and bit position i−1 to generate $G^2{}_{i+1}$ and $P^2{}_{i+1}$ bits.

A $P_{MH}$ cell in row 2 and bit position 3 (FIG. 12A) combines the $G^2{}_6$ and $P^2{}_6$ bits from the $P_L$ cell in row 2 and bit position 5 with the $G^2{}_2$ and $P^2{}_2$ bits from the $P_L$ cell in row 2 and bit position 1 to generate a $G^3{}_6$ bit, which is the carry bit $C_6$ asserted low. A $P_{MH}$ cell in row 2 and bit position 11 (FIG. 12B) combines the $G^2{}_{14}$ and $P^2{}_{14}$ bits from the $P_L$ cell in row 2 and bit position 13 with the $G^2{}_{10}$ and $P^2{}_{10}$ bits from the $P_L$ cell in row 2 and bit position 9 to generate $G^3{}_{14}$ and $P^3{}_{14}$ bits. A $P_B$ cell in row 2 and bit position 7 (FIG. 12A) combines the $G^3{}_{14}$ and $P^3{}_{14}$ bits from the $P_{MH}$ cell in row 2 and bit position 11 with the $G^3{}_6$ bit from the $P_{MH}$ cell in row 2 and bit position 3 to generate a $C_{14}$ signal.

A $P_{MH}$ cell in row 2 and bit position 19 (FIG. 12C) combines the $G^2{}_{22}$ the $P^2{}_{22}$ bits from the $P_L$ cell in row 2 and bit position 21 with the $G^2{}_{18}$ and $P^2{}_{18}$ bits from the $P_L$ cell in row 2 and bit position 17 to generate $G^3{}_{22}$ and $P^3{}_{22}$ bits. A $P_{ML}$ cell in row 2 and bit position 23 (FIG. 12C) combines the $G^2{}_{26}$ and $p^2{}_{26}$ bits from the $P_L$ cell in row 2 and bit position 25 (FIG. 12D) with the $G^3{}_{22}$ and $p^3{}_{22}$ bits from the $P_{MH}$ cell in row 2 and bit position 19 (FIG. 12C) to generate $G^4{}_{26}$ and $p^4{}_{26}$ bits. A $P_{MH}$ cell in row 2 and bit position 27 (FIG. 12D) combines the $G^2{}_{30}$ and $p^2{}_{30}$ bits from the $P_L$ cell in row 2 and bit position 29 with the $G^4{}_{26}$ and $p^4{}_{26}$ bits from the $P_{ML}$ cell in row 2 and bit position 23 (FIG. 12C) to generate $G^5{}_{30}$ $P^5{}_{30}$ bits.

A third row (ROW 3) of cells in the adder 130 of FIGS. 12A to 12D consists of $C_H$ cells, as shown in FIG. 8, $C_L$ cells, as shown in FIG. 9, and inverting buffers. The $C_H$ and $C_L$ cells are alternately positioned in row 3, and most of the $C_H$ and $C_L$ cells are included in chained segments of three to four cells.

A $C_H$ cell in row 3 and bit position 1 (FIG. 12A) receives the $G_0$ and $P_0$ bits from the PG cell in row 1 and bit position 0, and also receives the $C_{in}$ signal, to generate a $C_1$ bit asserted low. A $C_L$ cell in row 3 and bit position 2 receives the $G_1$ and $P_1$ bits from the PG cell in row 1 and bit position 1, and the $C_1$ bit asserted low from the $C_H$ cell in row 3 and bit position 1, to generate a $C_2$ bit asserted high.

An inverting buffer 151 in row 3 and bit position 3 receives the $G^2{}_2$ bit from the $P_L$ cell in row 2 and bit position 1 to provide a $C_2$ bit asserted low.

A first segment of chained carry cells has three cells in row 3 and bit positions 4, 5, and 6. A $C_L$ cell in row 3 and bit position 4 receives the $G_3$ and $P_3$ bits from the PG cell in row 1 and bit position 3, and the $C_2$ bit asserted low from the inverter 151, to generate a $C_3$ bit asserted high. A $C_H$ cell in row 3 and bit position 5 receives the $G_4$ and $P_4$ bits from the PG cell in row 1 and bit position 4, and the $C_3$ bit asserted high from the $C_L$ cell in row 3 and bit position 4, to generate a $C_4$ bit asserted low. A $C_L$ cell in row 3 and bit position 6 receives the $G_5$ and $P_5$ bits from the PG cell in row 1 and bit position 5, and the $C_4$ bit asserted low from the $C_H$ cell in row 3 and bit position 5, to generate a $C_5$ bit asserted high.

An inverting buffer 152 in row 3 and bit position 7 receives the $G^3{}_6$ bit from the $P_{MH}$ cell in row 2 and bit position 2 to provide a $C_6$ bit. Another inverting buffer 153 in row 3 and bit position 7 receives the $C_6$ bit and provides a $C_6{}'$ bit asserted low.

Figure 12B:
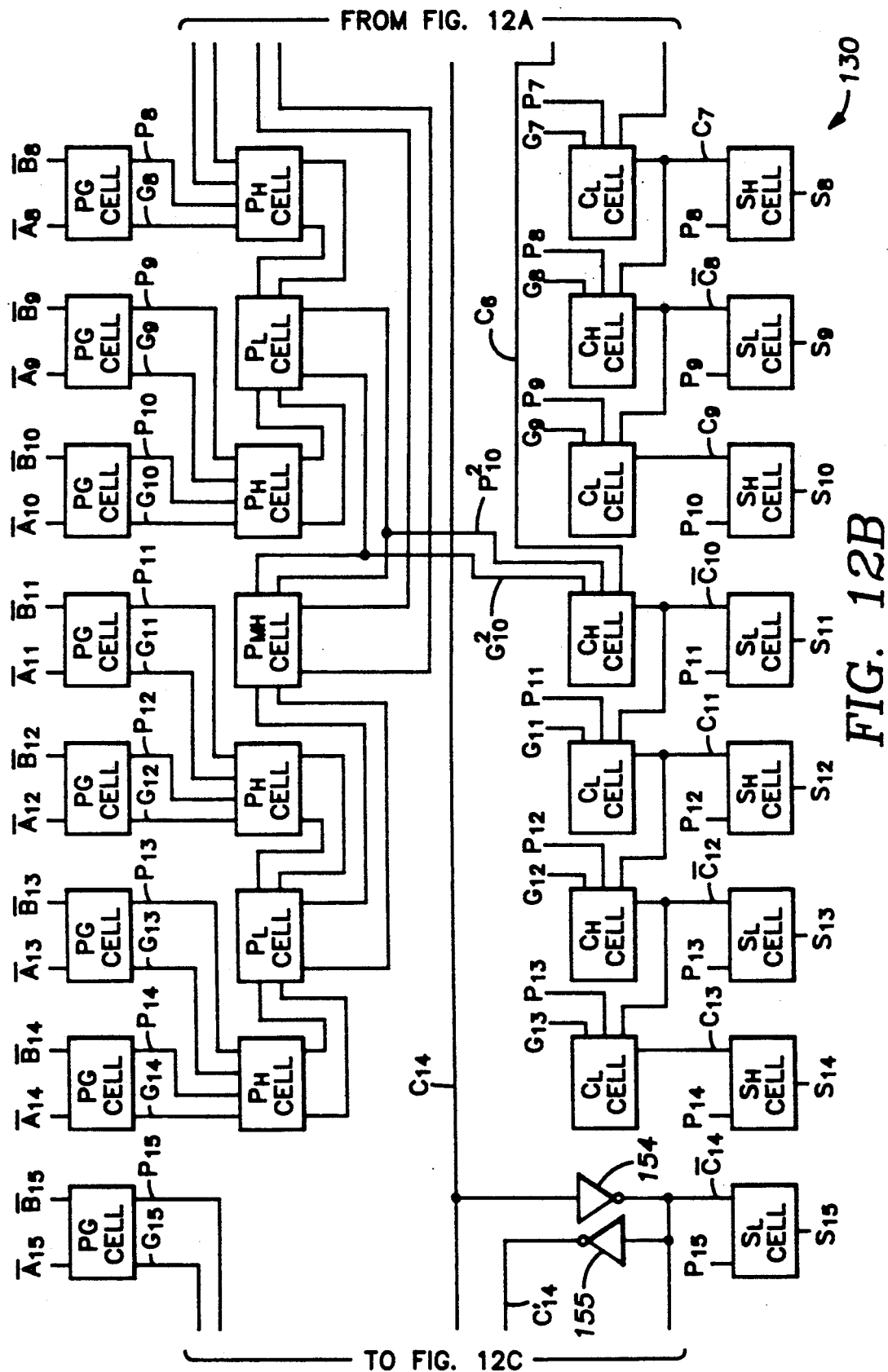

A second segment of chained carry cells has three cells in row 3 and bit positions 8, 9, and 10 (FIG. 12B). A $C_L$ cell in row 3 and bit position 8 receives the $G_7$ and $P_7$ bits from the GP cell in row 1 and bit position 7 (FIG. 12A), and the $C_6{}'$ asserted low bit from the inverting buffer 153 (FIG. 12A), to generate a $C_7$ bit asserted high. A $C_H$ cell in row 3 and bit position 9 (FIG. 12 B) receives the $G_8$ and $P_8$ bits from the GP cell in row 1 and bit position 8, and the $C_7$ bit asserted high from the $C_L$ cell in row 3 and bit position 8, to generate a $C_8$ bit asserted low. A CL cell in row 3 and bit position 10 receives the $G_9$ and $P_9$ bits from the GP cell in row 1 and bit position 9, and the $C_8$ bit asserted low from the $C_H$ cell in row 1 and bit position 9, to generate a $C_9$ bit asserted high.

A third segment of chained carry cells has four cells in row 3 and bit positions 11, 12, 13, and 14. A $C_H$ cell in row 3 and bit position 11 receives a $G^2{}_{10}$ bit and a $P^2{}_{10}$ bit from the $P_L$ cell in row 3 and bit position 9, and the $C_6$ bit from inverting buffer 152 (FIG. 12A), to generate a $C_{10}$ bit asserted low. A $C_L$ cell in row 3 and bit position 12 receives the $G_{11}$ and $P_{11}$ bits from the PG cell in row 1 and bit position 11, and the $C_{10}$ bit asserted low from the $C_H$ cell in row 3 and bit position 11, to generate a $C_{11}$ bit asserted high. A $C_H$ cell in row 3 and bit position 13 receives the $G_{12}$ and $P_{12}$ bits from the PG cell in row 1 and bit position 12, and the $C_{11}$ bit asserted high from the $C_L$ cell in row 3 and bit position 12, to generate a $C_{12}$ bit asserted low. A $C_L$ cell in row 3 and bit position 14 receives the $G_{13}$ and $P_{13}$ bits from the PG cell in row 1 and bit position 13, and the $C_{12}$ bit asserted low from the $C_H$ cell in row 3 and bit position 13, to generate a $C_{13}$ bit asserted high.

An inverting buffer 154 in row 3 and bit position 15 receives the C14 bit from the $P_B$ cell in row 2, bit position 7 (FIG. 12A) to provide a $C_{14}$ bit asserted low. Another inverting buffer 155 in row 3 and bit position 15 (FIG. 12B) receives the $C_{14}$ bit asserted low and provides a $C_{14}{}'$ bit asserted high.

Figure 12C:
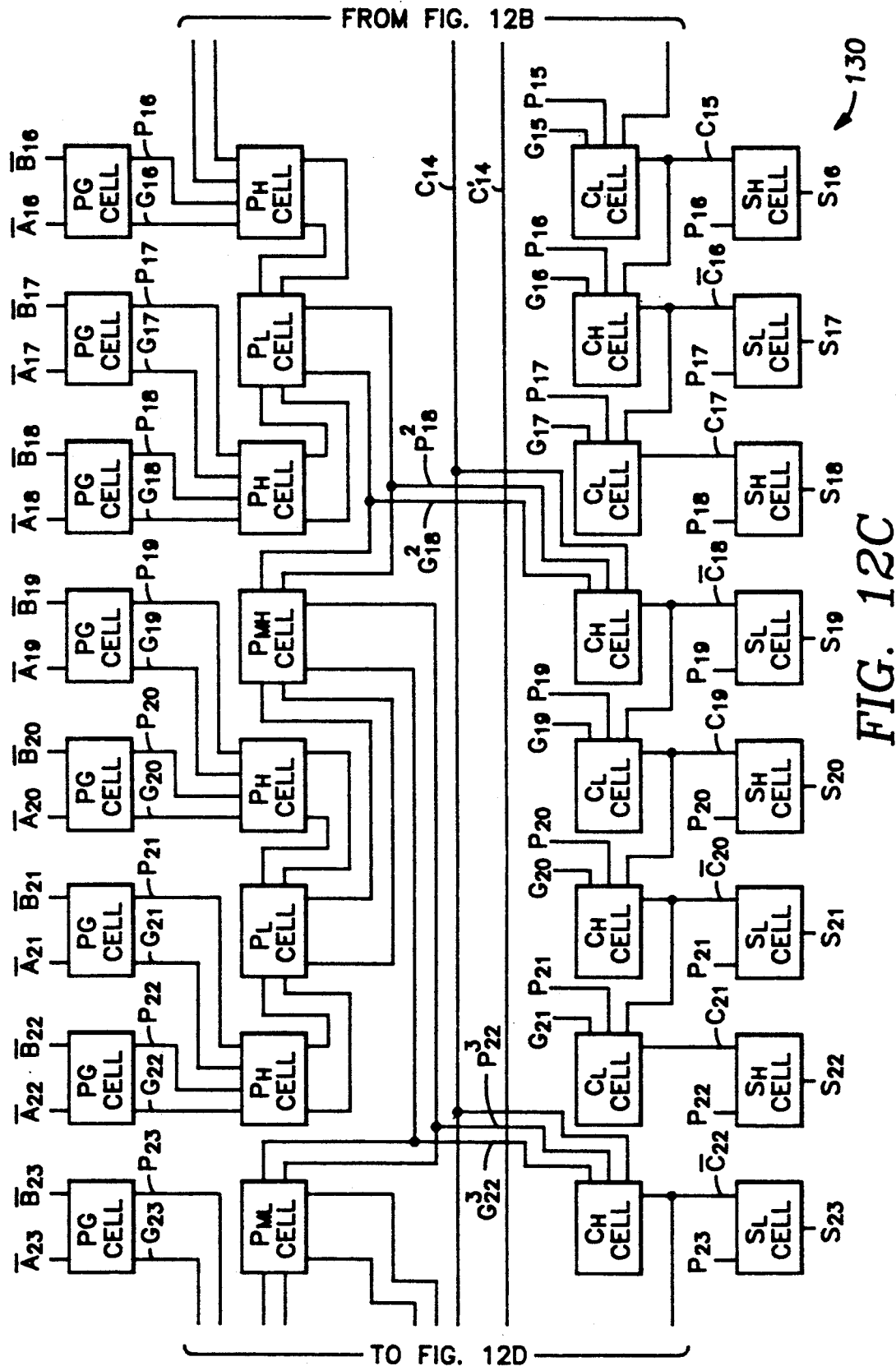
Figure 13:
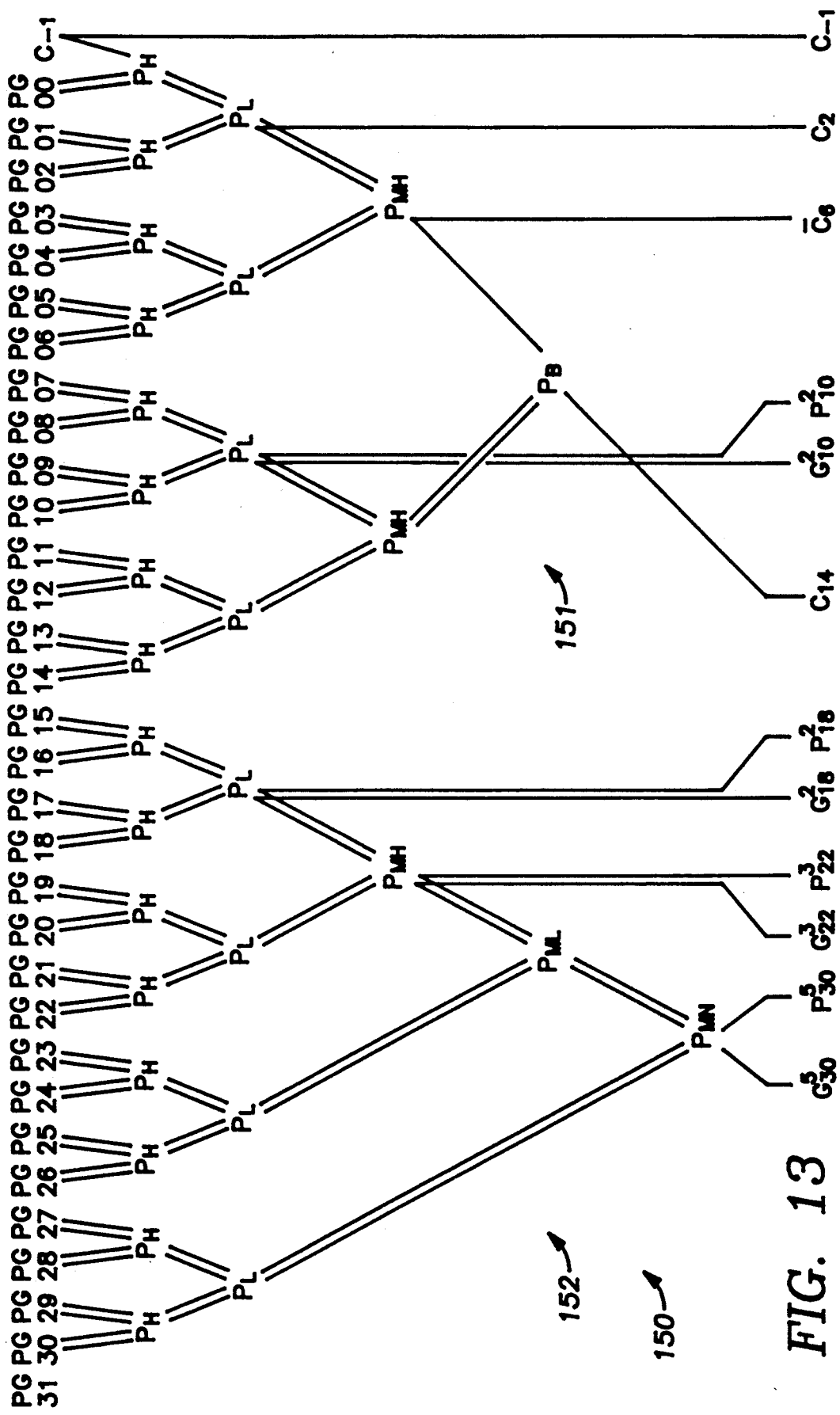
FIG. 13 shows a graph of the interconnections between the block-propagate bit cells in the adder of FIGS. 12A, 12B, 12C, and 12D.

A fourth segment of chained carry cells has three cells in row 3 and bit positions 16, 17, and 18 (FIG. 12C). A $C_L$ cell in row 3 and bit position 16 receives the $G_{15}$ and $P_{15}$ bits from the PG cell in row 1 and bit position 15 (FIG. 12B), and the $C_{14}$ bit asserted low from the inverting buffer 154, to generate a $C_{15}$ bit asserted high. A $C_H$ cell in row 3 and bit position 17 (FIG. 12C) receives the $G_{16}$ and $P_{16}$ bits from the PG cell in row 1 and bit position 16, and the $C_{15}$ bit asserted high from the $C_L$ cell in row 3 and bit position 16, to generate a $C_{16}$ bit asserted low. A $C_L$ cell in row 3 and bit position 18 receives the $G_{17}$ and $P_{17}$ bits from the PG cell in row 1 and column 17, and the $C_{16}$ bit asserted low from the $C_H$ cell in row 3 and column 17, to generate a $C_{17}$ bit asserted high.

A fifth segment of chained carry cells has four cells in row 3 and bit positions 19, 20, 21, and 22. A $C_H$ cell in row 3 and bit position 19 receives $G^3{}_{22}$ $P^3{}_{22}$ bits from the $P_L$ cell in row 2 and bit position 17, and the $C_{14}$ bit from the $P_B$ cell in row 2 and bit position 7 (FIG. 12A), to generate a $C_{18}$ bit asserted low. A $C_L$ cell in row 3 and bit position 20 (FIG. 12C) receives the $G_{19}$ and $P_{19}$ bits from the PG cell in row 1 and bit position 19, and the $C_{18}$ bit asserted low from the $C_L$ cell in row 3 and bit position 19, to generate a $C_{19}$ bit asserted high. A $C_H$ cell in row 3 and bit position 21 receives the $G_{20}$ and $P_{20}$ bits from the PG cell in row 1 and bit position 20, and the $C_{19}$ bit asserted high from the $C_L$ cell in row 3 and bit position 20, to generate a $C_{20}$ bit asserted low. A $C_L$ cell in row 3 and bit position 22 receives the $G_{21}$ and $P_{21}$ bits from the PG cell in row 1 and bit position 21, and the $C_{20}$ bit asserted low from the $C_H$ cell in row 3 and bit position 20, to generate a $C_{21}$ bit asserted high.

Figure 12D:
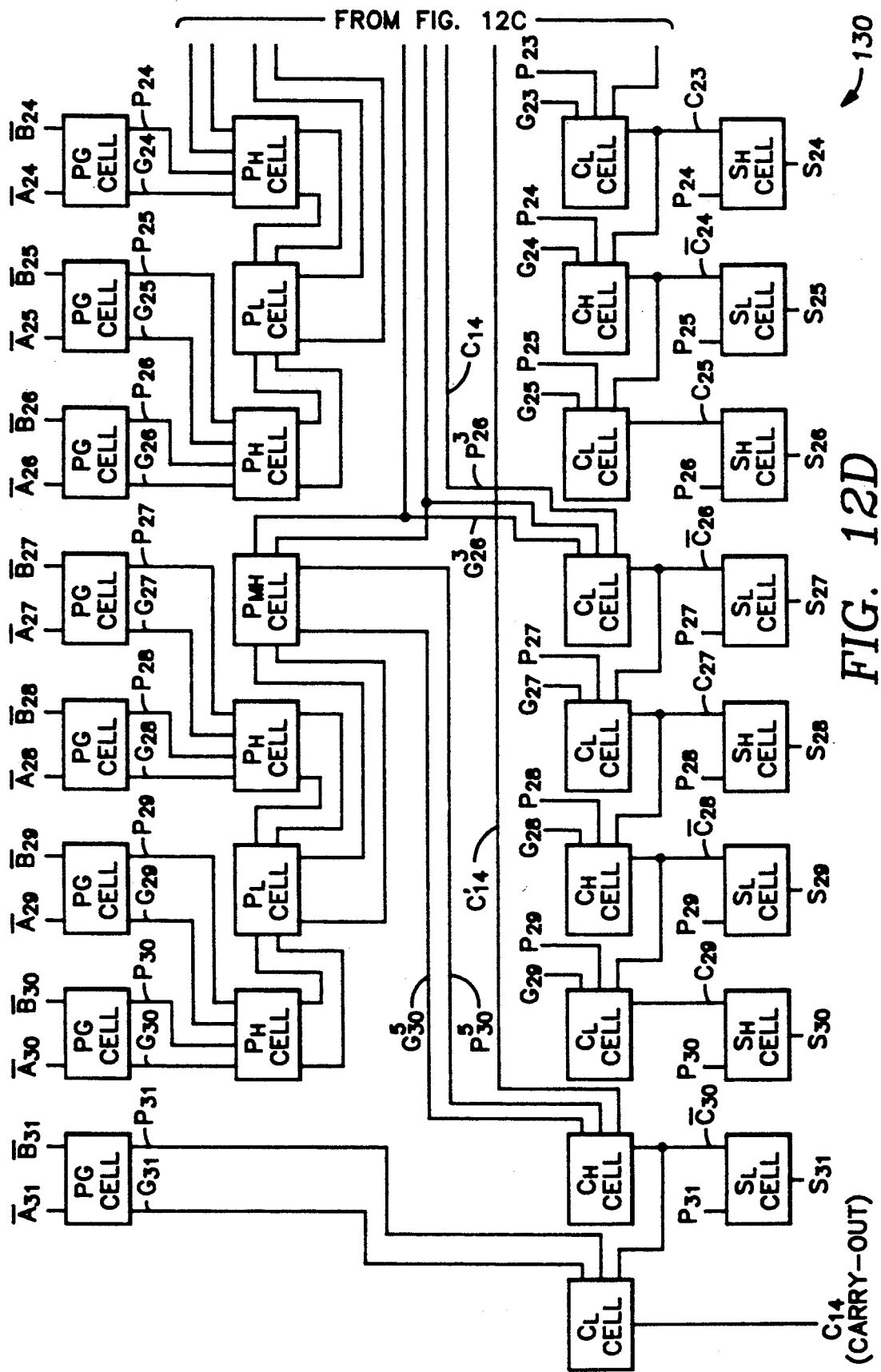

A sixth segment of chained carry cells has four cells in row 3 and bit positions 23, 24, 25, and 26 (FIGS. 12C to 12D). A $C_H$ cell in row 3 and bit position 23 receives $G^3{}_{22}$ and $P^3{}_{22}$ bits from the $P_{MH}$ cell in row 2 and bit position 19, and the $C_{14}$ bit from $P_B$ cell in row 2 and bit position 7 (FIG. 12A), to generate a $C_{22}$ bit asserted low. A $C_L$ cell in row 3 and bit position 24 (FIG. 12D)

receives the $G_{23}$ and $P_{23}$ bits from the PG cell in row 1 and bit position 23 (FIG. 12C), and the $C_{22}$ bit asserted low from the $C_H$ cell in row 3 and bit position 23 (FIG. 12C), to generate a $C_{23}$ bit asserted high. A $C_H$ cell in row 3 and bit position 25 (FIG. 12D) receives the $G_{24}$ and $P_{24}$ bits from the PG cell in row 1 and bit position 24, and the $C_{23}$ bit asserted high from the $C_L$ cell in row 3 and bit position 24, to generate a $C_{24}$ bit asserted low. A $C_L$ cell in row 3 and bit position 26 receives the $G_{25}$ and $P_{25}$ bits from the PG cell in row 1 and bit position 25, and the $C_{24}$ bit asserted low from the $C_H$ cell in row 3 and bit position 25, to generate a $C_{25}$ bit asserted high.

A seventh segment of chained carry cells has four cells in row 3 and bit positions 27, 28, 29, and 30. A $C_H$ cell in row 3 and bit position 27 receives the $G^3_{26}$ and $P^3_{26}$ bits from $P_{ML}$ cell in row 2 and bit position 23 (FIG. 12C), and $C_{14}$ bit from the $P_B$ cell in row 2 and bit position 7 (FIG. 12A), to generate a $C_{26}$ bit asserted low. A $C_L$ cell in row 3 and bit position 28 receives the $G_{27}$ and $P_{27}$ bits from the PG cell in row 1 and bit position 27, and the $C_{26}$ bit asserted low from the $C_H$ cell in row 3 and bit position 27, to generate a $C_{27}$ bit asserted high. A $C_H$ cell in row 3 and bit position 29 receives the $G_{28}$ and $P_{28}$ bits from the PG cell in row 1 and bit position 28, and the $C_{27}$ bit asserted high from the $C_L$ cell in row 3 and bit position 27, to generate a $C_{28}$ bit asserted low. A $C_L$ cell in row 3 and bit position 30 receives the $G_{29}$ and $P_{29}$ bits from the PG cell in row 1 and bit position 29, and the $C_{28}$ bit asserted low from the $C_H$ cell in row 3 and bit position 29, to generate a $C_{29}$ bit asserted high.

A $C_H$ cell in row 3 and bit position 31 receives the $G^5_{30}$ and $P^5_{30}$ bits from the $P_{MH}$ cell in row 2 and bit position 27, and the $C_{14}'$ bit from the inverting buffer 155 (FIG. 12B), to generate a $C_{30}$ bit asserted low. A $C_L$ cell in row 3 and bit position 32 receives the $G_{31}$ and $P_{31}$ bits from the PG cell in row 1 and bit position 31 and the $C_{30}$ bit asserted low to generate a $C_{31}$ bit asserted high. The $C_{31}$ bit asserted high is the "carry out" of the adder 130 in FIGS. 12A to 12D.

The fourth row of cells in the adder 130 has either a $S_H$ or $S_L$ cell in each of the bit positions 0 to 31. An $S_H$ cell, as shown in FIG. 10, is in each of the even bit positions 0, 2, 4, ..., 30, and an $S_L$ cell, as shown in FIG. 11, is in each of the odd bit positions. As shown in FIGS. 12A to 12D, each $S_L$ or $S_H$ cell in row 3 and the ith bit position receives the $P_i$ bit from the PG cell in row 1 and bit position i and also receives the $C_{i-1}$ bit to generate the sum bit $S_i$. The S cell in row 4 and bit position 0 (FIG. 12A) receives the $C_{in}$ bit which is the "carry in" for the adder 130. The $S_L$ cell in row 4 and bit position 3 receives the $C_2$ bit asserted low from the inverting buffer 151. The $S_L$ cell in bit position 7 receives the $C_6'$ bit asserted low from the inverting buffer 153. The $S_L$ cell in bit position 15 (FIG. 12B) receives the $C_{14}$ bit asserted low from the inverting buffer 154. The $S_L$ cells in row 4 in each of the other bit positions i=1, 3, 5, 9, 11, 13, 15, 17, 19, 21, 23, 25, 27, 29, and 31 receive the $C_i$ bit, asserted low, from the $C_L$ cell in row 3 and the i−1th bit position. Each of the $S_H$ cells in row 4 and in each of the bit positions i=0, 2, 4, ..., 30 receives the $C_i$ bit, asserted high, from the $C_H$ cell in row 3 and the i−1th bit position.

The interconnections between the cells in the adder 130 of FIGS. 12A to 12D have certain regularities and certain irregularities. Of interest in the general case of an n bit adder are the irregularities in the interconnections between the block-propagate bit cells in row 2 and the irregularities in the interconnections between the block-propagate bit cells and the carry-bit cells and inverting buffers in row 3. The irregularities result primarily from an optimization of speed for carry propagation from the carry input $C_{in}$ and the other low-order inputs to the carry output $C_{31}$, and secondarily, from a desire to minimize the number and length of transverse interconnects which run parallel to the rows of cells. In a specific embodiment, two layers of metal are used for cell interconnections. The lower layer of metal is used for transverse connections, and the upper layer of metal is used for vertical connections within the bit positions.

In general, the optimum interconnections for speed and chip area are most easily found by considering several possible graphs representing the interconnections between the block-propagate bit cells. Shown in FIG. 13, for example, is a graph 150 corresponding to the circuit of the layout in FIGS. 12A to 12D. The block-propagate cells in row 2 of the adder form two trees 151, 152. The trees generate a hierarch of block-propagate and block-generate bits. The trees are binary due to the desire to use gates with a fan-in of two and a fan-in of three. The two trees 151, 152 each include a similar number of block-propagate bit cells ($P_H$, $P_L$, $P_{MH}$, $P_{ML}$, $P_B$). The first tree 151 combines the carry-in $C_{-1}$ with lower-order propagate-bits $P_i$ and generate bits $G_i$ for order i=0 to 14, and the second tree 152 combines higher-order propagate bits $P_i$ and generate bits $G_i$ for order i=15 to 30. The low-order sides of each tree 151, 152 is tapped at intervals to feed signals to the segments of chained carry-bit cells to minimize fan-out. The first tree 151 is regular and balanced to minimize the time for propagation of the carry input and other low-order inputs. The second tree 152 is somewhat irregular or unbalanced to minimize the number and length of transverse interconnections so as to further minimize chip area. The taps of carry bits from the low-order sides of the trees are also selected to minimize the length of transverse interconnections so as to minimize chip area. The fact that an area-efficient layout has resulted is evident from the occurrence of cells or inverting buffers in almost all of the cell positions in the array and the fact that in most of the bit positions there are 7 or 8 transverse interconnect lines between rows 2 and 3. Moreover, the combining of the carry-in $C_{-1}$ with the block-propagate and block-generate bits in the low-order part of the adder has eliminated the need for a propagate signal for bits 0 to 14 to be sent to the high-order part of the adder. The allows the $P_B$ cell (91 in FIG. 6) to be implemented without a "propagate gate" (i.e., a gate similar to the gate 85 in the $P_{MH}$ cell 81 of FIG. 5) leaving room in the layout for the OR-AND-INVERT gate 94 in the $P_B$ cell to be two-times larger than the standard size and therefore have twice the standard current drive strength. Furthermore, it should be apparent from FIG. 13 that a similar design could be used for a 64-bit or 128-bit adder, with slightly more than a linear increase in chip area and a slight increase in delay. A 64-bit adder, for example, would require only one additional level of depth in the binary trees.

In view of the above, there has been described a carry look-ahead adder that obtains high speed with minimum gate fan-in and a regular array of area-efficient logic cells in a datapath. The carry-look ahead logic uses a hierarch of recurrence solver cells to maximize speed. The recurrence solver cells are interconnected in two binary trees, so that the recurrence solver cells can be constructed of gates having a minimum fan-in. To minimize fan-out, the low-order sides of the trees are tapped at intervals to feed signals to segments of chained carry-bit cells. Although some of the taps of the trees may have a relatively high fan-out, sufficient gate levels exist at these taps to build-up dive strength. Therefore, a very optimum architecture results for building fast binary adders from static CMOS gates.

What is claimed is:

1. A method of adding an n-bit binary augend $A=A_{n-1}, A_{n-2}, \ldots, A_i, \ldots, A_0$ to an n-bit binary addend $B=B_{n-1}, B_{n-2}, \ldots, B_i, \ldots, B_0$ and a carry-in $C_{-1}$ to compute an n-bit sum $S=S_{n-1}, S_{n-2}, \ldots, S_i, \ldots, S_0$ and a carry-out $C_{n-1}$; said method comprising the steps of:

computing, from each augend bit $A_i$ and a corresponding addend bit $B_i$, a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$;

using the propagate bits and generate bits to solve the recurrence relation for $i=0$ to $n-1$ to generate the carry bits $C_{n-1}, C_{n-2}, \ldots, C_i, \ldots, C_0$; some of said carry bits $C_i$ being computed directly from a corresponding generate bit $G_i$ and a corresponding propagate bit $P_i$ and a corresponding carry-in bit $C_{i-1}$; and computing each of the sum bits $S_i$ from a corresponding one of the propagate bits $P_i$ and a corresponding one of the carry bits $C_{i-1}$;

wherein the carry bits which are generated but not computed directly from a corresponding generate bit $G_i$ and a corresponding propagate bit $P_i$ and a corresponding carry-in bit $C_{i-1}$ are computed by generating a hierarchy of block-propagate and block-generate bits, including block-propagate bits and block-generate bits computed at a base level of said hierarchy by combining pairs of adjacent propagate bits $P_{i+1}, P_i$ and pairs of adjacent generate bits $G_{i+1}, G_i$; and wherein a multiplicity of the carry bits which are generated and computed directly from a corresponding generate bit $G_i$ and a corresponding propagate bit $P_i$ and a corresponding carry-in bit $C_{i-1}$ are included in a multiplicity of strings each including three adjacent carry bits $C_i, C_{i+1}, C_{i+2}$ which are each computed directly from a corresponding generate bit and a corresponding propagate bit and a corresponding carry-in bit.

2. The method as claimed in claim 1, wherein said hierarchy of block-propagate and block-generate bits is defined by a set of binary trees.

3. The method as claimed in claim 2, wherein said set of binary trees includes two binary trees, a first one of the binary trees combines lower-order propagate bits and generate bits, and a second one of the binary trees combines higher-order propagate bits and generate bits.

4. The method as claimed in claim 3, wherein said first one of said binary trees includes block-generate bits resulting from combining the carry-in $C_{-1}$ with the lower-order propagate bits and generate bits so that the first one of said binary trees has a root which includes a carry bit $C_x$ of order x of about one-half of n.

5. An n-bit binary adder for adding an augend $A=A_{n-1}, A_{n-2}, \ldots, A_i, \ldots, A_0$ to an addend $B=B_{n-1}, B_{n-2}, \ldots, B_i, \ldots, B_0$ and a carry-in $C_{-1}$ to the adder to compute a sum $S=S_{n-1}, S_{n-2}, \ldots, S_i, \ldots, S_0$ and a carry-out $C_{n-1}$ from the adder; said adder comprising:

a multiplicity of n propagate-generate bit cells of logic gates, each of said propagate-generate bit cells receiving a corresponding augend bit $A_i$ and a corresponding addend bit $B_i$ to compute a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$;

a multiplicity of recurrence solver cells of logic gates, said recurrence solver cells being responsive to the propagate bits and generate bits for solving the recurrence relation for $i=0$ to $n-1$ to generate the carry bits $C_{n-1}, C_{n-2}, \ldots, C_i, \ldots, C_0$; said recurrence solver cells including a multiplicity of carry bit cells, each of said carry-bit cells solving the recurrence relation to compute a corresponding carry-out bit $C_i$ from a corresponding generate bit $G_i$ and a corresponding propagate bit $P_i$ and a corresponding carry-in bit $C_{i-1}$; and a multiplicity of n sum bit cells of logic gates, each of said sum bit cells being connected to a respective one of said propagate-generate cells and each receiving a corresponding one of the carry bits $C_{i-1}$ to generate a corresponding one of the sum bits $S_i$;

wherein said recurrence solver cells further include a hierarchy of block-propagate bit cells for generating a hierarchy of block-propagate and block-generate bits, some of said block-propagate bit cells being at a base level of said hierarchy of block-propagate cells and combining propagate bits $P_{i+1}, P_i$ and generate bits $G_{i+1}, G_i$ of adjacent ones of said propagate-generate bit cells to generate block-propagate bits and block-generate bits responsive to the combined propagate bits $P_{i+1}, P_i$ and generate bits $G_{i+1}, G_i$ of adjacent ones of said propagate-generate bit cells; and wherein a multiplicity of said carry bit cells are chained in a plurality of segments such that each of said segments includes: a first carry bit cell responsive to one of said block-generate bits; a second carry bit cell receiving a carry $C_{i-1}$ generated by said first carry bit cell, and a propagate bit $P_i$ and generate bit $G_i$ from a corresponding one of said propagate-generate bit cells; and a third carry bit cell receiving a carry $C_i$ generated by said second carry bit cell, and a propagate bit $P_{i+1}$ and generate bit $G_{i+1}$ from a corresponding one of said propagate-generate bit cells.

6. The adder as claimed in claim 5, wherein said cells are physically arranged in an array of four rows and n columns on a planar semiconductor substrate, said rows including a first row of said propagate-generate bit cells, a second row of said block-propagate bit cells, a third row of said carry bit cells, and a fourth row of said sum bit cells, wherein said second row is disposed between said first row and said third row, and said third row is disposed between said second row and said fourth row.

7. The adder as claimed in claim 6, wherein said logic gates are complementary metal-oxide-semiconductor (CMOS) logic gates.

8. The adder as claimed in claim 7, wherein said logic gates each have a fan-in of at most three.

9. The adder as claimed in claim 5, wherein said block-propagate bit cells are interconnected to form two binary trees each including a similar number of said block-propagate bit cells, a first one of the binary trees combines lower-order propagate-bits and generate bits, and a second one of the binary trees combines higher-order propagate bits and generate bits.

10. The adder as claimed in claim 9, wherein said first one of said binary trees combines the carry-in $C_{-1}$ to the adder with the lower-order propagate bits and generate bits so that the first one of said binary trees has a root consisting of one of said block-generate cells that generates a carry bit $C_x$ of order x of about one-half of n.

11. The adder as claimed in claim 10, wherein said carry bit $C_x$ is received by a plurality of said carry bit cells which each receive a corresponding block-generate bit and block-propagate bit from said second one of said binary trees.

12. The adder as claimed in claim 11, further comprising a buffer connected between said one of said block-generate cells that generates said carry bit $C_x$ and said carry bit cells which each receive a corresponding block-generate bit and block-propagate bit from said second one of said binary trees.

13. The adder as claimed in claim 10, wherein said number n is thirty-two and said number x is 14.

14. The adder as claimed in claim 5, wherein said number n is at least thirty-two, and at least one of said segments includes at least four chained carry-bit cells.

15. The adder as claimed in claim 5, wherein said number n is thirty-two, and said segments include three segments of three chained carry bit cells, and four segments of four chained carry-bit cells.

16. The adder as claimed in claim 15, wherein said first carry bit cells in said segments generate carries $C_i$ for bit positions i=3, 7, 10, 15, 18, 22, and 26.

17. An n-bit binary adder for adding an augend $A = A_{n-1}, A_{n-2}, \ldots, A_i, \ldots, A_0$ to an addend $B = B_{n-1}, B_{n-2}, \ldots, B_i, \ldots, B_0$ and a carry-in $C_{-1}$ to the adder to compute a sum $S = S_{n-1}, S_{n-2}, \ldots, S_i, \ldots, S_0$ and a carry-out $C_{n-1}$ from the adder; said adder comprising:

a multiplicity of n propagate-generate bit cells of logic gates, each of said propagate-generate bit cells receiving a corresponding augend bit $A_i$ and a corresponding addend bit $B_i$ to compute a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$;

a multiplicity of recurrence solver cells of logic gates, said recurrence solver cells being responsive to the propagate bits and generate bits for solving the recurrence relation for i=0 to n−1 to generate the carry bits $C_{n-1}, C_{n-2}, \ldots, C_i, \ldots, C_0$; said recurrence solver cells including a multiplicity of carry bit cells, each of said carry-bit cells solving the recurrence relation to compute a corresponding carry-out bit $C_i$ from a corresponding generate bit $G_i$ and a corresponding propagate bit $P_i$ and a corresponding carry-in bit $C_{i-1}$; and a multiplicity of n sum bit cells of logic gates, each of said sum bit cells being connected to a respective one of said propagate-generate cells and each receiving a corresponding one of the carry bits $C_{i-1}$ to generate a corresponding one of the sum bits $S_i$;

wherein said recurrence solver cells further include a hierarchy of block-propagate bit cells for generating a hierarchy of block-propagate and block-generate bits, some of said block-propagate bit cells being at a base level of said hierarchy of block-propagate cells and combining propagate bits $P_{i+1}$, $P_i$ and generate bits $G_{i+1}$, $G_i$ of adjacent ones of said propagate-generate bit cells to generate block-propagate bits and block-generate bits responsive to the combined propagate bits $P_{i+1}$, $P_i$ and generate bits $G_{i+1}$, $G_i$ of adjacent ones of said propagate-generate bit cells; and wherein said cells are physically arranged in an array of four rows and n columns on a planar semiconductor substrate, said four rows including a first row of said propagate-generate bit cells, a second row of said block-propagate bit cells, a third row of said carry bit cells, and a fourth row of said sum bit cells, wherein said second row is disposed between said first row and said third row, and said third row is disposed between said second row and said fourth row.

18. The adder as claimed in claim 17, wherein said logic gates are complementary metal-oxide-semiconductor (CMOS) logic gates.

19. The adder as claimed in claim 18, wherein said logic gates each have a fan-in of at most three.

20. The adder as claimed in claim 17, wherein said block-propagate bit cells are interconnected to form two binary trees each including a similar number of said block-propagate bit cells, a first one of the binary trees combines lower-order propagate bits and generate bits, and a second one of the binary trees combines higher-order propagate bits and generate bits.

21. The adder as claimed in claim 20, wherein said first one of said binary trees combines the carry-in $C_{-1}$ to the adder with the lower-order propagate bits and generate bits so that the first one of said binary trees has a root consisting of one of said block-generate cells that generates a carry bit $C_x$ of order x of about one-half of n.

22. The adder as claimed in claim 21, wherein said carry bit $C_x$ is received by a plurality of said carry bit cells which each receive a corresponding block-generate bit and block-propagate bit from said second one of said binary trees.

23. The adder as claimed in claim 22, further comprising a buffer connected between said one of said block-generate cells that generates said carry bit $C_x$ and said carry bit cells which each receive a corresponding block-generate bit and block-propagate bit from said second one of said binary trees.

24. The adder as claimed in claim 21, wherein said number n is thirty-two and said number x is 14.

25. An n-bit binary adder for adding an augend $A = A_{n-1}, A_{n-2}, \ldots, A_i, \ldots, A_0$ to an addend $B = B_{n-1}, B_{n-2}, \ldots, B_i, \ldots, B_0$ and a carry-in $C_{-1}$ to the adder to compute a sum $S = S_{n-1}, S_{n-2}, \ldots, S_i, \ldots, S_0$ and a carry-out $C_{n-1}$ from the adder; said adder comprising:

a multiplicity of n propagate-generate bit cells of logic gates, each of said propagate-generate bit cells receiving a corresponding augend bit $A_i$ and a corresponding addend bit $B_i$ to compute a corresponding generate bit $G_i$ and a corresponding propagate bit $P_i$ such that a corresponding carry-out bit $C_i$ is related to a corresponding carry-in bit $C_{i-1}$ by a recurrence relation $C_i = G_i + (P_i \cdot C_{i-1})$;

a multiplicity of recurrence solver cells of logic gates, said recurrence solver cells being responsive to the propagate bits and generate bits for solving the recurrence relation for i=0 to n−1 to generate the carry bits $C_{n-1}, C_{n-2}, \ldots, C_i, \ldots, C_0$; said recurrence solver cells including a multiplicity of carry bit cells, each of said carry-bit cells solving the recurrence relation to compute a corresponding carry-out bit $C_i$ from a corresponding generate bit $G_i$ and a corresponding propagate bit $P_i$ and a corresponding carry-in bit $C_{i-1}$; and a multiplicity of n sum bit cells of logic gates, each of said sum bit cells being connected to a respective one of said propagate-generate cells and each receiving a corresponding one of the carry bits $C_{i-1}$ to generate a corresponding one of the sum bits $S_i$;

wherein said recurrence solver cells further include a hierarchy of block-propagate bit cells for generating a hierarchy of block-propagate and block-generate bits, some of said block-propagate bit cells being at a base level of said hierarchy of block-propagate cells and combining propagate bits $P_{i+1}$, $P_i$ and generate bits $G_{i+1}$, $G_i$ of adjacent ones of said propagate-generate bit cells to generate block-propagate bits and block-generate bits responsive to the combined propagate bits $P_{i+1}$, $P_i$ and generate bits $G_{i+1}$, $G_i$ of adjacent ones of said propagate-generate bit cells;

wherein a multiplicity of said carry bit cells are chained in a plurality of segments such that each of said segments includes: a first carry bit cell responsive to one of said block-generate bits; a second carry bit cell receiving a carry $C_{i-1}$ generated by said first carry bit cell, and a propagate bit $P_i$ and generate bit $G_i$ from a corresponding one of said propagate-generate bit cells; and a third carry bit cell receiving a carry $C_i$ generated by said second carry bit cell, and a propagate bit $P_{i-1}$ and generate bit $G_{i+1}$ from a corresponding one of said propagate-generate bit cells, wherein said cells are physically arranged in an array of four rows and n columns on a planar semiconductor substrate, said rows including a first row of said propagate-generate bit cells, a second row of said block-propagate bit cells, a third row of said carry bit cells, and a fourth row of said sum bit cells, wherein said second row is disposed between said first row and said third row, and said third row is disposed between said second and fourth rows, and wherein said block-propagate bit cells are interconnected to form two binary trees each including a similar number of said block-propagate bit cells, a first one of the binary trees combines lower-order propagate bits and generate bits, and a second one of the binary trees combines higher-order propagate bits and generate bits.

26. The adder as claimed in claim 25, wherein said logic gates are complementary metal-oxide-semiconductor (CMOS) logic gates.

27. The adder as claimed in claim 26, wherein said logic gates each have a fan-in of at most three.

28. The adder as claimed in claim 25, wherein said first one of said binary trees combines the carry-in $C_{-1}$ to the adder with the lower-order propagate bits and generate bits so that the first one of said binary trees has a root consisting of one of said block-generate cells that generates a carry bit $C_x$ of order x of about one-half of n.

29. The adder as claimed in claim 28, wherein said carry bit $C_x$ is received by a plurality of said carry bit cells which each receive a corresponding block-generate bit and block-propagate bit from said second one of said binary trees, and further comprising a buffer connected between said one of said block-generate cells that generates said carry bit $C_x$ and said carry bit cells which each receive a corresponding block-generate bit and block-propagate bit from said second one of said binary trees.

30. The adder as claimed in claim 28, wherein said number n is thirty-two and said number x is 14.

* * * * *